A. B. Overbaugh.
Ditching Mach.
N° 87,357.        Patented Mar. 2, 1869.
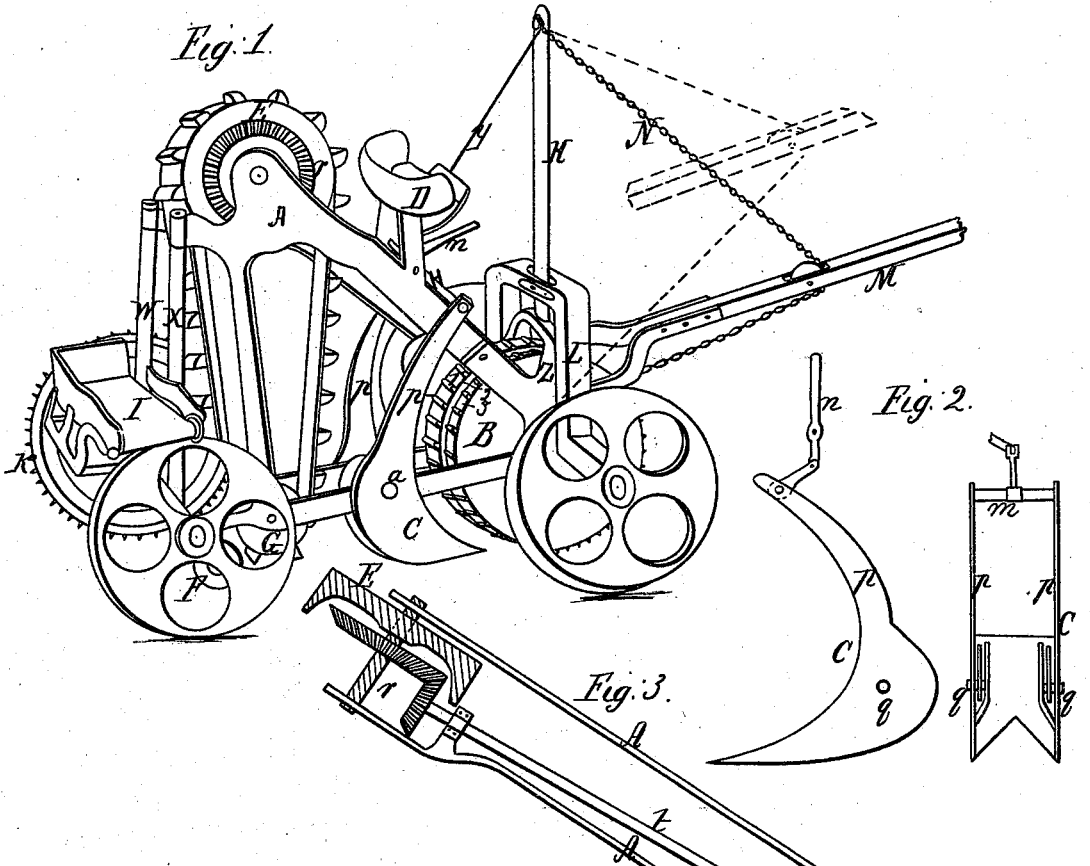
Fig. 1.
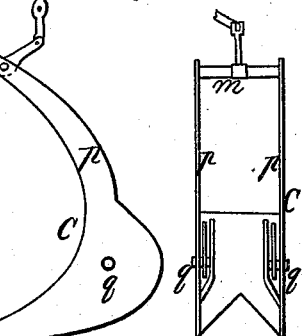
Fig. 2.
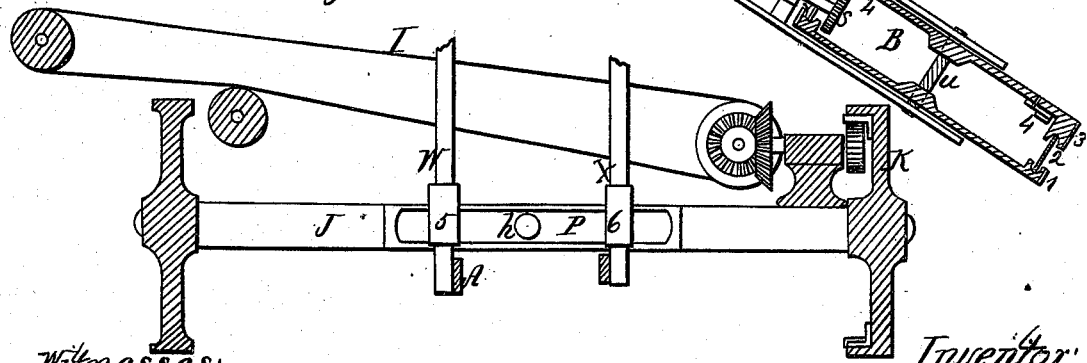
Fig. 3.
Fig. 4.
Witnesses:
Wm. Gooding
Edward Collier
Inventor,
A. B. Overbaugh

ABRAM B. OVERBAUGH, OF NEWARK, NEW JERSEY, ASSIGNOR TO OLIVER REEVES, OF SAME PLACE.

*Letters Patent No. 87,357, dated March 2, 1869.*

IMPROVED DITCHING-MACHINE.

The Schedule referred to in these Letters Patent and making part of the same.

*To all whom it may concern:*

Be it known that I, ABRAM B. OVERBAUGH, of Newark, New Jersey, have invented certain Improvements in Ditching-Machines; and I hereby declare the following, taken in connection with the drawings that accompany and form part of this specification, to be a full and sufficient description, to enable an expert to construct and use the same.

My improvements consist in a peculiarly-formed plow, or shovel; in a manner of gearing, and protecting the gearing that moves the elevators; in a manner of adaptation of the axle-trees, to allow the automatic descent of the plow, or shovel, as the ditch deepens; a manner of preserving an evenness of draught by the team as the machine descends, in deepening the ditch; and in combining a transverse endless apron, to carry the dirt to the side of the ditch, outside the track of the wheels.

In the drawings—

Figure 1 is a perspective view of the complete machine.

Figure 2 is the shovel, or plow.

Figure 3 is a sectional view of the manner of gearing and protecting of gearing for the elevators.

Figure 4 shows the hind axle-tree, with the support of the frame, and the movement of the transverse apron.

The same letters refer to the same parts in each figure.

A frame, A, of a triangular form, has attached to it the compound driving-wheel B, the digger, scoop, or plow C, the driver's seat D, elevator-drum E, at the top, and at the bottom the carrying-drum or wheel F, and the elevator-drum G.

Upon the connecting cross-bar Z of the frame A, at its forward end, is the upright bar H, the top of which is held, by the brace $y$, to the frame A.

At the rear of the frame A are two upright bars, W and X, which are fast to the frame at both ends.

The compound driving-wheel B is shown in section in fig. 3. It has three parts, 1, 2, 3, in its rim, and a spur-gear, 4, in the inside. The rims 1 and 3 have the usual spurs on their outsides, to insure their turning the machinery attached to them. These wheels are fast on the shaft $u$, upon which rests the front end of the frame A. The part 2 is a rim of sheet-metal, fitting loosely in grooves in 1 and 3, having an opening for the long shaft $t$ to pass through, the shaft keeping the rim from turning with 1 and 3. This is for the purpose of shielding the gearing in the inside from dirt, when the machine is in use. The shaft $t$, driven by the pinion $s$ on its lower end, and by bevel-gear $r$ on its upper end, drives the elevator-drum E.

The scoop, or plow C, is metallic. Its entering-end is angularly indented, to facilitate its work, and its sides are made double at the lower part, to strengthen it, to guide the dirt between the bars of the frame into the elevators behind it, and to support each end of the bolts $q$, which attach it to the frame A, and on which it turns in and out its work. The arms $p$ extend upward to the upper bars of the frame A, and, when in work, rest upon the lugs $o$, on the side of the frame. By the lever $n$ and connecting-link on the bar $m$, the operator puts the scoop in or out of work, at pleasure.

The transverse apron I, at the rear, is supported by suitable frame-work, attached to the hind axle J, and is driven by the wheel K, by spur-gear inside the wheel, and bevel-gear attached to the roller over which the endless apron I turns.

A bent axle, L, straddles the front end of the frame A, having on it wheels that run on each side of ditch. To this axle the pole M is connected. The axle and pole being loose on the bar H, can slide up or down freely thereon.

The draught of the frame A is, by the chain N, attached at the lower end to the front of the frame A, and at its upper end to the bar H, the chain passing through the pole at just the distance from the frame as allows the draught of the frame to be by the chain, as the axle rises on the bar by the sinking of A and its attachments as the ditch deepens, as shown by dotted lines.

The frame A has at its back end a bar, P, to which two sleeves, 5 and 6, are cast fast, through which slide freely the bars W and X. The bar P is attached to the axle J by the centre-bolt $h$, upon which the axle can vibrate, to accommodate the machine to irregularities in the surface over which the wheels pass. The axle, as the ditch deepens, sustains the transverse apron in a position to receive the dirt from the elevators from any required depth of ditch, conveying it to the side, beyond the track of the wheels.

What I claim as my improvements, and desire to secure by Letters Patent, is—

1. The loose vibratory sliding axles L and J, constructed and attached as shown, in combination with the frame A and scoop C, substantially as described.

2. The upright bar H, and chain N, when combined with the pole M and frame A, in the manner and for the purpose hereinabove set forth.

ABRAM B. OVERBAUGH.

Witnesses:
W. M. GOODING,
EDWARD COLLVER.